United States Patent [19]
Selusnik et al.

[11] 3,974,922
[45] Aug. 17, 1976

[54] CAN DEPALLETIZER

[75] Inventors: Jerome A. Selusnik, Chicago;
Robert W. Wolfe, Oak Lawn;
William J. Cartwright, Palos Park;
Oliver C. Tate, Darien, all of Ill.

[73] Assignee: Continental Can Company, Inc.,
New York, N.Y.

[22] Filed: Feb. 28, 1975

[21] Appl. No.: 554,078

Related U.S. Application Data

[62] Division of Ser. No. 364,591, May 29, 1973, Pat. No. 3,869,049.

[52] U.S. Cl. .............................. 214/8.5 K; 198/35;
214/6 P; 214/6 H; 214/95 R; 221/297
[51] Int. Cl.².......................................... B65G 59/06
[58] Field of Search .............. 214/6 F, 8.5 K, 8.5 A,
214/6 H, 6 P, 6 DK, 95 R, 75 R, 315, 394;
198/35, 163; 221/297

[56] References Cited
FOREIGN PATENTS OR APPLICATIONS

| | | | |
|---|---|---|---|
| 212,562 | 4/1967 | Sweden | 214/8.5 K |
| 159,453 | 12/1962 | U.S.S.R. | 214/8.5 K |

*Primary Examiner*—Robert J. Spar
*Assistant Examiner*—George F. Abraham
*Attorney, Agent, or Firm*—Diller, Brown, Ramik & Wight

[57] ABSTRACT

A depalletizer apparatus for unloading containers or other articles stacked in tiers which are separated by paperboard upon a pallet. The apparatus has a pallet infeed section, an elevator means for sequentially raising a loaded pallet to a height of one tier and sweep means operated in conjunction with the elevator to remove each tier onto a conveyor. Also disclosed is a pallet discharge means, and a paperboard removal means which together with the sweep means operate to move the pallets, the containers, and the paperboard onto three conveyors for transporting same to three separate collection areas, all conveyors being located adjacent the top of the elevator means. Finally, this specification also discloses a second elevator means for receiving the unloaded pallets and stacking same as well as a compartment for receiving paperboard and collecting same in a manner to facilitate subsequent removal and reuse.

7 Claims, 9 Drawing Figures

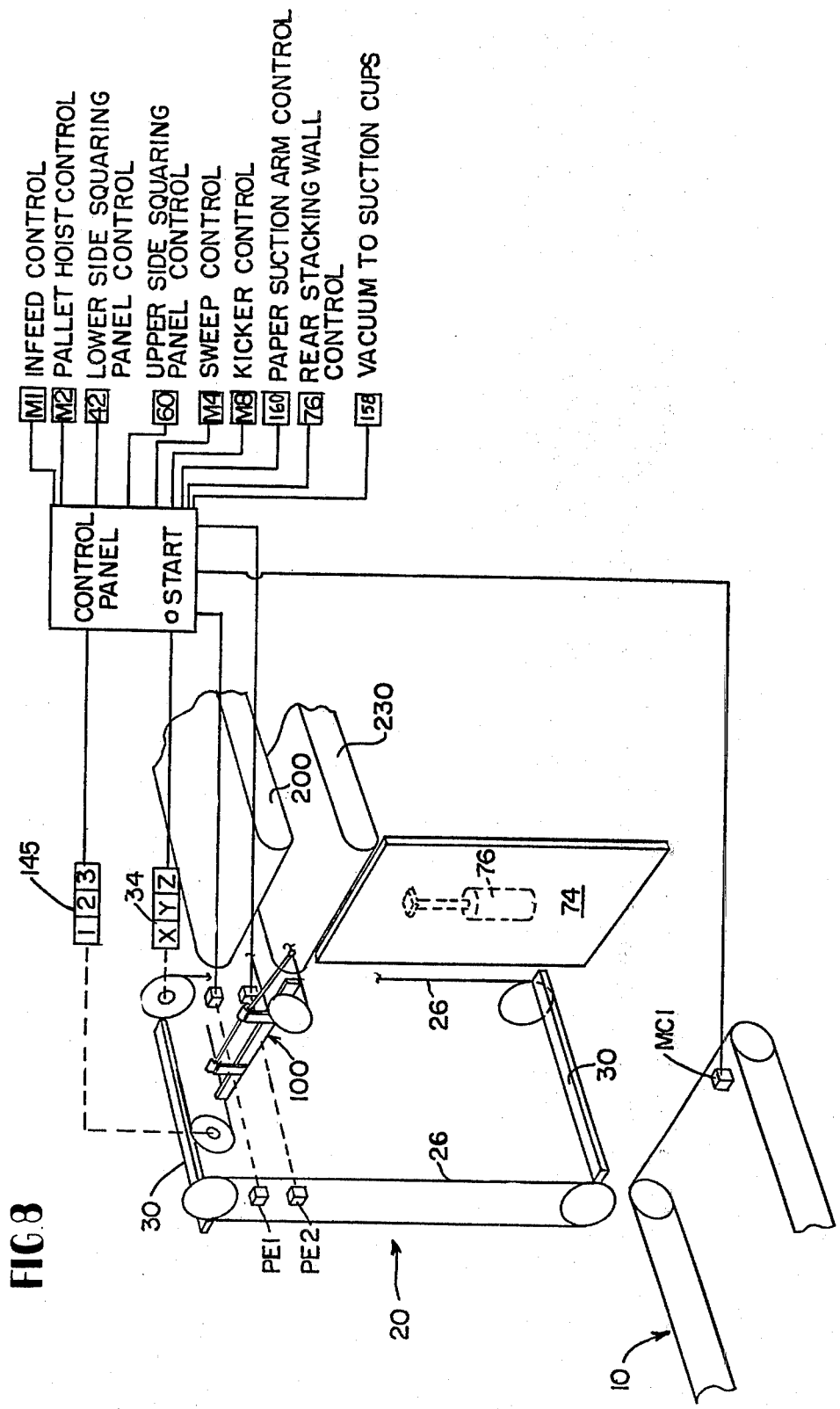

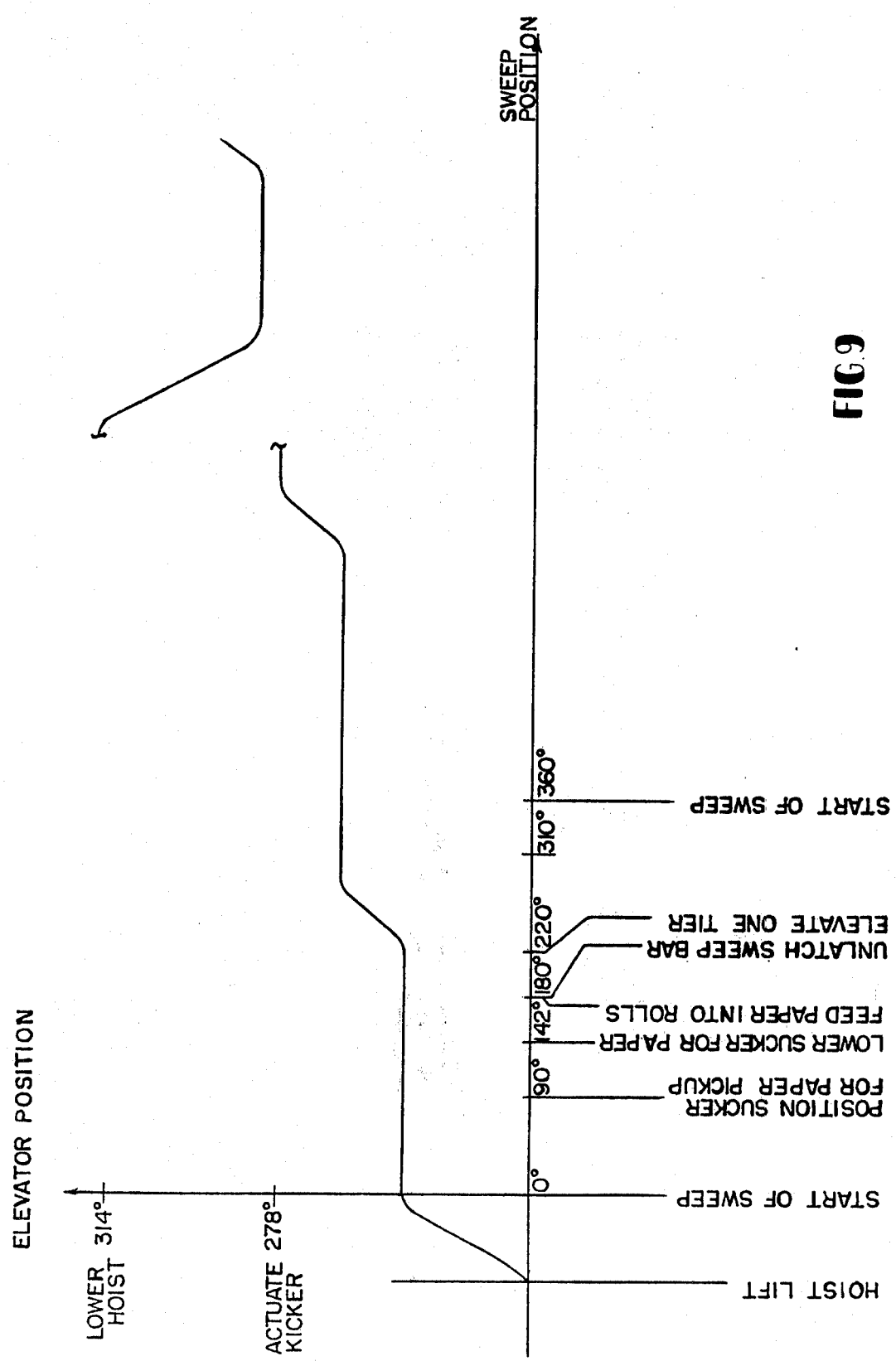

CAN DEPALLETIZER

This is a division of Ser. No. 364,591, filed May 29, 1973, now U.S. Pat. No. 3,869,049, granted Mar. 4, 1975.

BACKGROUND OF THE INVENTION

This invention relates to an article handling system. More specifically, it relates to a system and apparatus for depalletizing containers from a loaded pallet.

Containers are conventionally transported from the manufacturer to the user upon a pallet which includes a square or rectangular surface supporting tiers of cans or the like separated by paperboard. Upon receiving the loaded pallets, the container user must unload the pallet and move the containers to a filling machine for filling and subsequent application of a closure to the open end. An increase in the rate of filling such containers requires an increase in the rate of supply of containers to the filling machine. Accordingly, the instant invention relates to a depalletizer apparatus which has the capacity to remove empty containers from a pallet at a very high speed for delivery of same to a filling machine.

SUMMARY OF THE INVENTION

To increase the delivery rate of empty containers from a loaded pallet to a filling machine, the instant invention includes a loaded pallet input section, an elevator section, three separate discharge means located adjacent the top of the elevator for discharging the containers, the paperboard and the pallets from the elevator section. These materials are then conveyed to separate collection areas by three, preferably, parallel conveyors including a paperboard conveyor, a container conveyor, and an empty pallet conveyor. At the collection areas, the paperboard and the empty pallets are collected in such a manner as to facilitate subsequent handling thereof and return to the container manufacturer while the containers are directed to the filling machine. The invention also includes a control interrelation between each of the separate discharge means so as to preclude any substantial delays or lag time in the separate machine movements for separating the paperboard, containers, and pallets.

Accordingly, it is an object of the instant invention to provide an improved container depalletizer which has a capability for an increased rate of container discharge. Too, it is an object of the instant invention to provide a material handling apparatus in which the input means for the loaded pallet is isolated from the collection area for the paperboard and empty pallets so as to more efficiently utilize available space within a filling plant. Another object of the instant invention is to provide separate discharge means for containers, paperboard and empty pallets in which these three discharge means have an inter-related control system for minimizing the time span between the various mechanical steps relating to depalletizing. Another object of the instant invention is to provide a collection system and apparatus for collecting the paperboard and pallets in a separate area so as to facilitate the utilizaton of space, and to minimize the amount of time required to handle these articles for return to the container manufacturer. Finally, it is an object of this invention to provide a mechanical sweep apparatus for removing the containers from the pallet which has an inherent acceleration feature to permit smooth, non-abrupt engagement with a tier of containers and subsequent speed increase without causing the containers to fall over or disrupt their vertical standing position.

DESCRIPTION OF THE DRAWINGS

The manner in which these and other objects of this invention is attained will be made clear by a consideration of the following specification and claims when taken in conjunction with the drawings in which:

FIG. 7 is a side elevation view of the collection areas for the paperboard and empty pallets as viewed along the lines 7—7 of FIG. 1 with portions broken away;

FIG. 8 is a schematic view in perspective depicting a preferred embodiment of the hoist section, and the controls therefor; and FIG. 9 is a graph disclosing a preferred mode of operation of our invention; and has the position of the sweep mechanism plotted along the horizontal axis, the position of the hoist means plotted along the vertical axis, and depicts the control inter-relationship between these two mechanisms.

DETAIL DESCRIPTION

Figure 1:
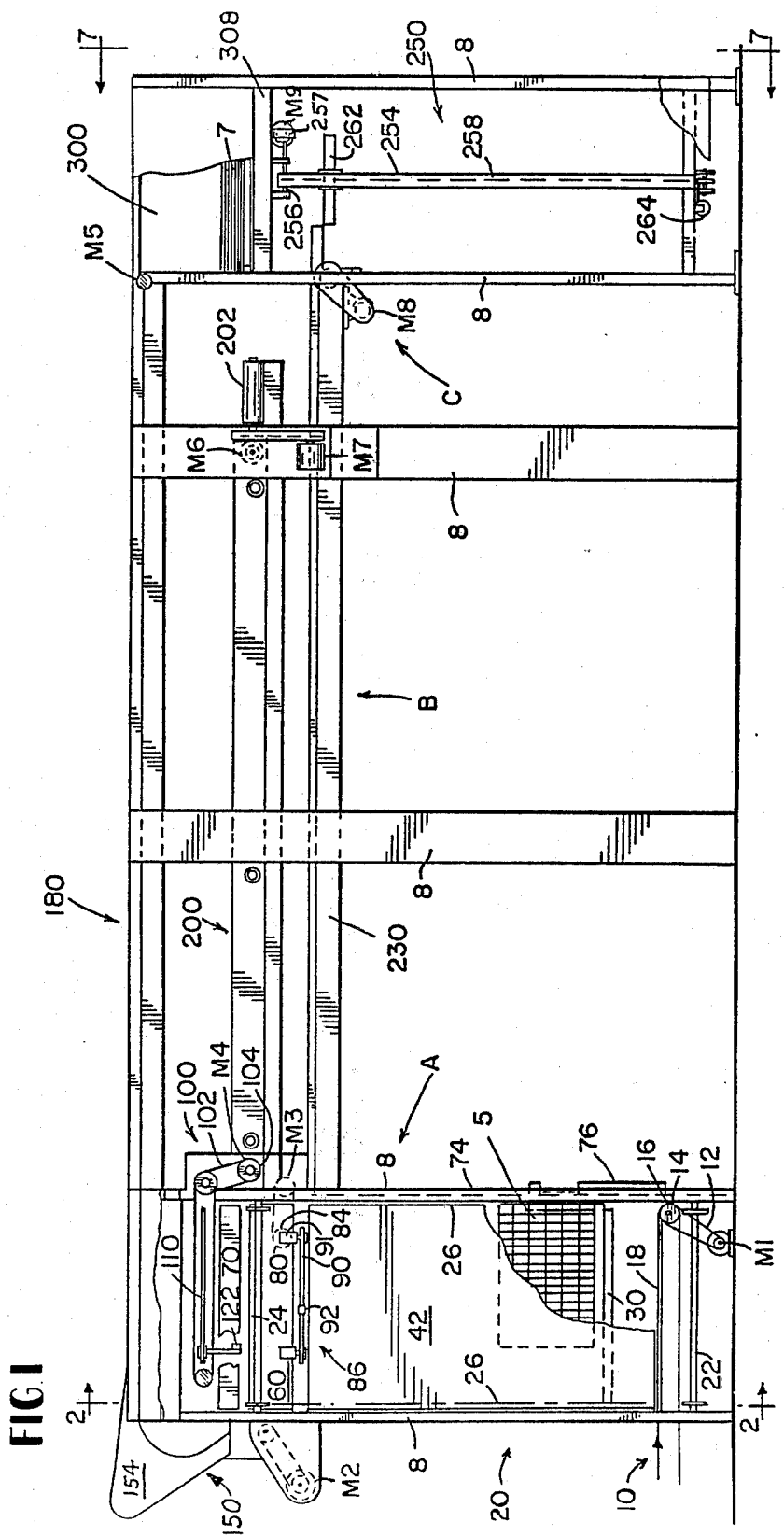
FIG. 1 is a side elevation view of a preferred embodiment of our invention.

As depicted in FIG. 1, the preferred embodiment of our invention comprises an elevator and discharge section A, a conveyor section B, and a collection station C, each section being supported by vertical members 8. In normal operation, the depalletizer receives loaded container pallets 5 from an infeed conveyor 10, and delivers them to hoist 20 to elevate same to the discharge means. As subsequently set forth, the loaded pallet 5 is raised to the discharge area adjacent the top of the hoist 20 for separate discharge of the containers, the paperboard from the top and between the tiers of the containers, and the empty pallets. These discharge means include a kicker assembly 86 which will discharge the empty pallets, a sweep assembly 100 which discharges the cans, and a paper pick-up assembly 150 which will discharge the paperboard sheets. Thus it should be apparent that as a loaded pallet is placed into an elevator assembly 20, it is vertically raised with the containers, paperboard and pallets being separately discharged adjacent the top of the elevator system 20. Since this discharge does occur at the top of the hoist 20, a second loaded pallet may be moved from the infeed conveyor 10 into the hoist 20 while still discharging without lowering the previous pallet and the hoist to the initial pallet pick-up position.

Each of the discharge means, e.g. the pallet kicker assembly 86, the sweep mechanism 100 for the containers and the paper pick-up 150 will respectively discharge the pallets into a pallet conveyor 230, a container conveyor 200, and a paper conveyor 180. As illustrated in FIG. 1, the empty pallets will be conveyed to a collection elevator 250 at station C while the paperboard sheets are conveyed to a collection area 300. The containers, however, must be moved to filling line runways and after being swept from the pallet 5, they are moved by conveyor 200 to a cross conveyor 202 which appropriately delivers the cans to the runways. Essentially, the basic structure of our preferred embodiment is shown by FIG. 1 and the prior discussion illustrates a preferred mode of operation. Each of the primary mechanisms of this embodiment will be further discussed with reference to specific drawings so as to fully disclose the structure and manner of operation of this preferred embodiment.

THE INFEED AND HOIST SYSTEMS

Figure 2:
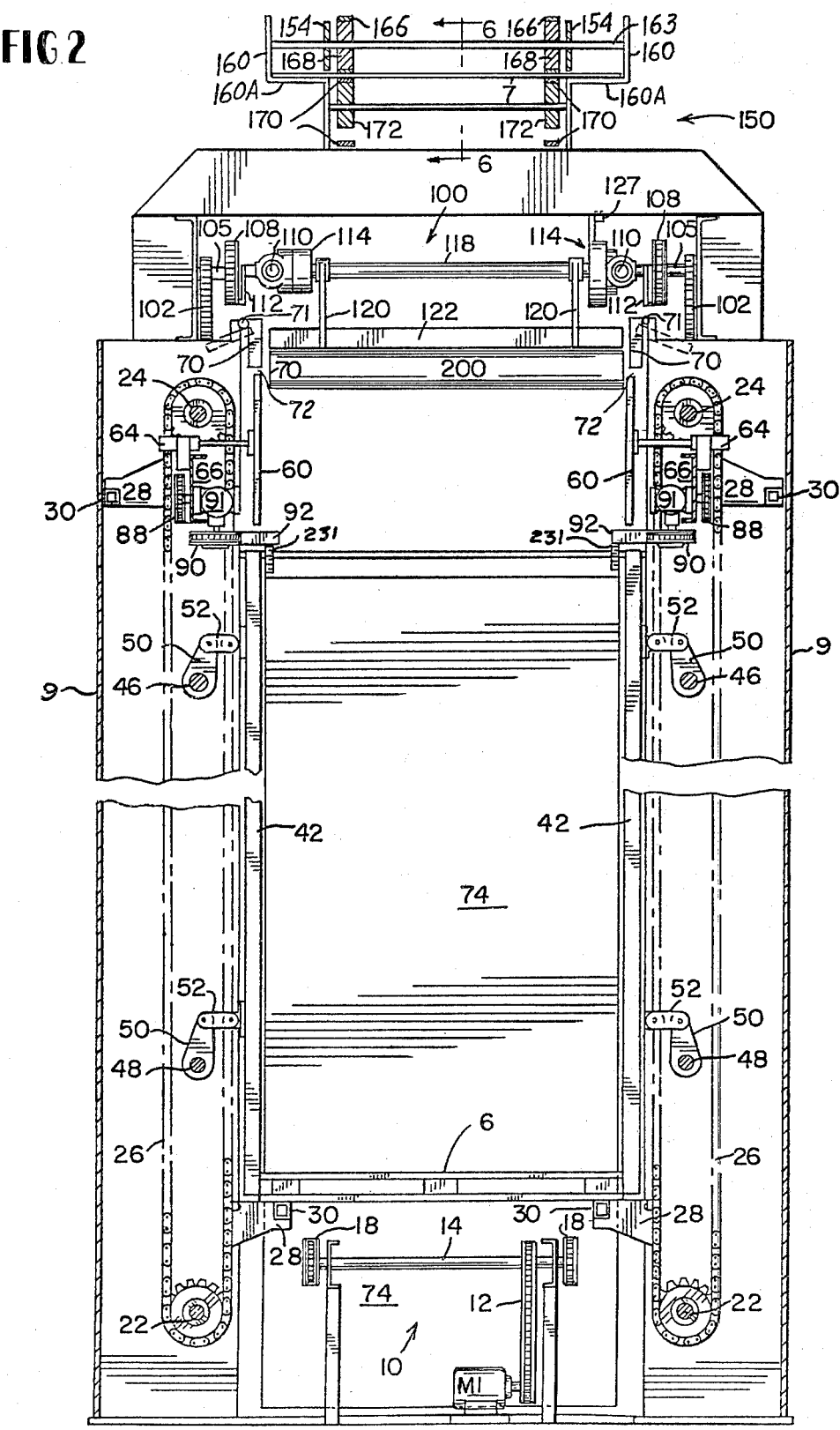
FIG. 2 is a front elevation view of the preferred embodiment taken along the lines 2—2 of FIG. 1.
Figure 3:
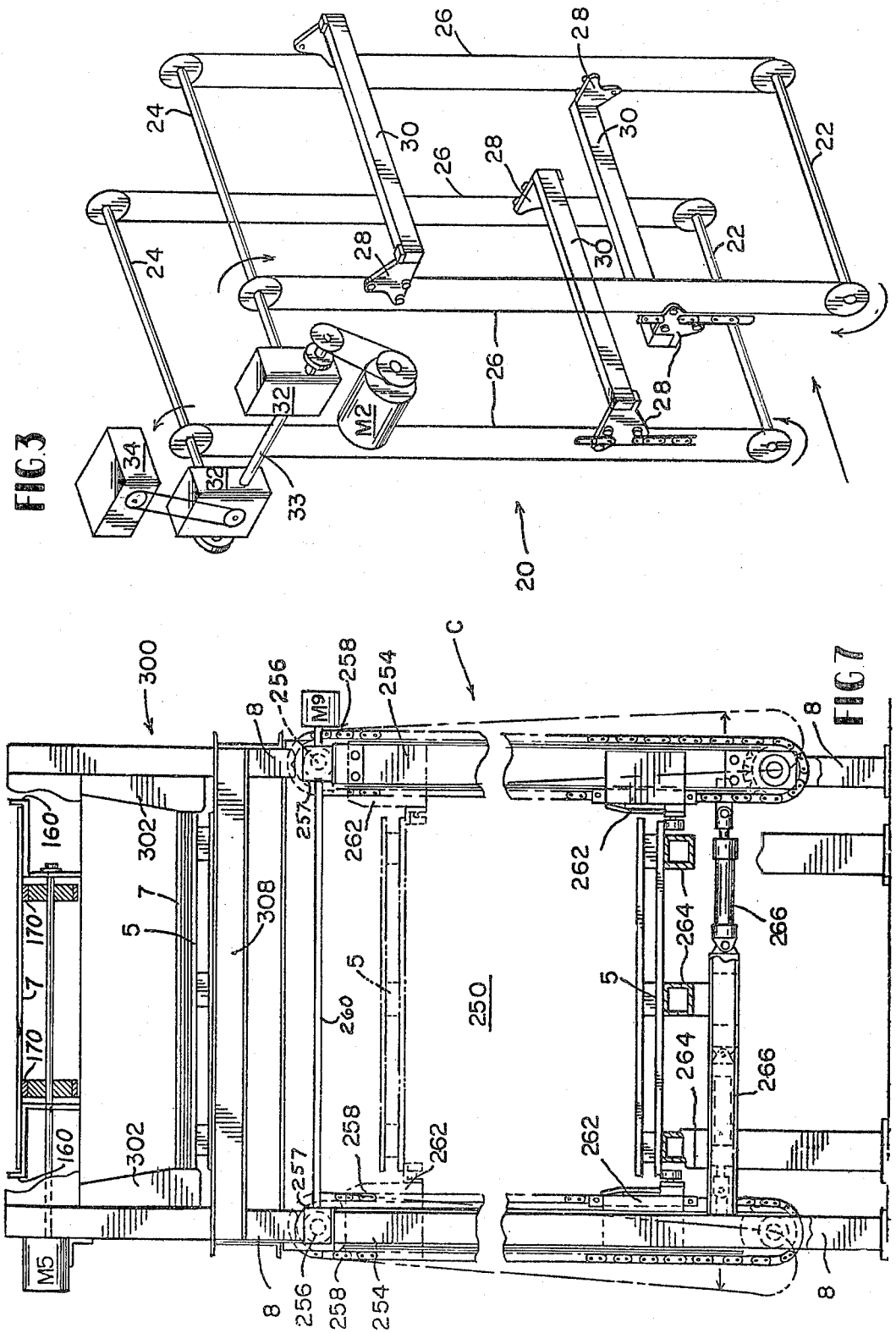
FIG. 3 is a schematic drawing in perspective of a preferred embodiment of the elevator hoist apparatus for the invention.

The infeed and hoist systems are best depicted in FIGS. 1, 2 and 3. With reference to FIG. 1, a chain type conveyor 10 delivers loaded pallets into the hoist area 20. This infeed conveyor may comprise supports as shown in FIG. 2 journaling a cross shaft 14 which carries a chain conveyor 18 through sprockets constrained for rotation with the shaft at each end thereof. Upon an input signal, the motor M1 through a chain drive 12 causes the infeed conveyor 10 to rotate in the direction indicated by the arrow in FIG. 1. Preferably, the conveyor will move the pallet into the conveyor section against a rear stacking wall 74 at which time a micro switch (approximately positioned) will cause the motor M1 to stop. The hoist section is appropriately supported by four upstanding members 8 and is enclosed by plates 9 extending between the members 8 on each side of the hoist section. Journaled between side supports 8 are two lower shafts 22 which extend the depth of the elevator section 20 (see FIGS. 2 and 3). Constrained for rotation with the shaft 22 at each end is a sprocket as shown. Additionally, appropriately mounted at the top of the supports 8 are upper cross shafts 24 also having sprockets constrained for rotation therewith. Between the upper and lower sprockets of the cross shafts 22 and 24 is a set of drive chains 26 each carrying lift bars 39 through extending arms 28. Preferably, there are two lift bars 30 on each set of the chains timed so that each bar is diametrically opposed to a mating bar on the other chain. Too, each of the lift bars 30 is positioned approximately 180° from the other bar on the same chain set. As subsequently explained, such permits an unloaded pallet at the top of the elevator assembly to be removed from the hoist and a second pallet 5 to be subsequently picked up at the bottom of the elevator hoist 20 adjacent the infeed conveyor 10 with little time delay. With reference to FIG. 3, the hoist elevator assembly 20 is driven by a motor M2 through right angle reduction gear boxes 32 interconnected by shaft 33 and attached to each of the cross shafts 24. Additionally, a cam timer such as that sold under the brand name Gemco, Model No. series 1980 by Gemco Electric Company of Clawson, Mich. is driven by a chain drive from one of the gear boxes 32, the drive being such that the timer electrically indicates the position of the lift bars 30 throughout a complete revolution of one lift bar 30. Such may be done by utilizing cams within the timer which have 360° rotation and are coordinated with the hoist chain to rotate through one revolution for every ½ revolution of the hoist chain 26. These cams will indicate the position of each lift bar 30 and pallet thereon at any vertical position and may be used to initiate and control other portions of the apparatus as subsequently explained. Too, the motor M2 is reversible, and may be operated in steps, or by electrically actuated clutches to sequentially permit a transfer of rotational power to the cross shafts 24 so as to raise the lift bars 30 sequentially for a vertical distance of one can or tier height.

Operating in conjunction with the elevator hoist 20 are squaring devices which will insure that the containers are properly aligned with the edges of the pallet and ready for discharge by the sweep mechanism 100 onto conveyor 200. Referring again to FIGS. 1 and 2, squaring devices include a rear stacking wall 74 which is vertically movable for purposes hereinafter explained, and lower side squaring panels 42. After a loading pallet is delivered into the hoist section 20, these lower side squaring panels 42 are urged inwardly so as to square the loaded containers with the side edges of the pallet. This inward movement is effected by pneumatic cylinders (not shown) to rotate an upper cross shaft 46 and a lower cross shaft 48, each of which extends the depth of the elevator section 20. Rotation of the shafts 46 and 48 causes rotational movement of levers 50 in an inward direction such that a horizontal movement may be imparted to the panel 42 through the connecting links 52.

Above these lower side squaring panels are upper side squaring panels 60. These are placed above a pallet discharge or kicker assembly 86 and are adapted to maintain the upper tiers of containers square as they are elevated to the level of the container discharge conveyor 200. These upper side squaring devices 60 are reciprocated in and out of the elevator shaft by pneumatic cylinders or air motors 64 supported by cross beams 66 as shown. Finally, above these side squaring devices 60 are two additional side guides 70 which are pivotally attached at 71 to the vertical supports 8. The purpose of these upper side guides is to maintain alignment of the very top tiers of cans which is to be swept onto the conveyor 200. Pneumatic motors (not shown) can be used to rotate the bottom portion of guides 70 outwardly to provide a larger space 72 between guides 60 and 70 through which the lift bars must pass as hoist chain 26 rotates through its cycle.

Accordingly, after a loaded pallet has entered into the elevator area 20, a micro switch will stop the motor M1 and actuate the lower side squaring devices panels 42 to initially square the tiers of containers with the side of the pallet. Too, the forward side of the tiers will be squared as the infeed conveyor pushes the pallet into engagement with the stacking wall 74. As the first pallet to be unloaded is moved upwardly, the upper tiers will come into a position with the upper side squaring panels 60 which will maintain the tiers of containers adjacent thereto square with respect to the pallet. While the last few tiers of containers are being unloaded, a second pallet can be moved into the elevator assembly and squared by the lower side squaring panels 42.

THE SWEEP MECHANISM

The mechanism which successively sweeps each tier onto conveyor 200 can best be understood with reference to FIGS. 1, 2, 4 and 5. Appropriately supported by the columns 8 or through a connection therewith, the sweep assembly is carried by two bars 110 extending along opposite sides of the elevator hoist 20. Slides 111, which reciprocate along these bars, indirectly support a sweep bar 122 which engages the rear side of each tier and moves the containers onto conveyor 200. The mechanism for reciprocating the sweep may comprise a chain drive means including a motor M4 driving a cross shaft 104 which in turn rotates stub shafts 105 through chain drives 102. Rotational motion of these shafts 105 drive sweep chains 108 about sprockets positioned as indicated. An extensible arm 112 connects slides 111 mounted on the shafts 110 to the chain drive 108. Thus rotational movement of the chain 108 about the sprockets will cause a horizontal reciprocation of the slides 111 and the sweep mechanism carried thereby. In the sweep direction of the assembly 100, the arms 112 drag the unit while in the reverse direction, the arms push the assembly. Connected to the slides 111 are housings 114 which carry a cross shaft 118 and the depending sweep bar 122. One of these housings merely serves as a bushing for the shaft 118 while the other housing comprises a latch assembly 116 more thoroughly depicted in FIG. 5.

As illustrated, the cross bar 118 carries two depending arms 120 to which is attached the sweep bar 122. The full line position of the sweep bar represents its downward position for sweeping a tier of containers onto the conveyor 200. However, in this position, the elevator hoist 20 cannot be raised without the next tier striking the bar 122. Thus, means are provided for rotating and elevating the sweep bar during its rearward stroke so that during this reciprocation, the elevator 20 may be vertically moved the height of one tier of containers. To effect elevation and depression of the sweep bar 122, one of the members 114 contains a latching mechanism 116 which normally latches the sweep bar in the downward position. Thus, the shaft 118 journaled within the housings 114 is attached and constrained for rotation with a pinion 124 which engages gear teeth on a cam actuated rack 126 vertically movable within housing 114. Between the bottom of the housing 114 and within a bore in the rack 126 is a spring means 128 urging the rack 126 to its uppermost position and attempting to rotate the shaft 118 in a clockwise direction so as to elevate depending arms 120 and sweep bar 122. To preclude such rotation and to hold the sweep bar in a downward position, a latch member 130 pivoted at 131 is normally held in engagement with a detent 134 of pinion 124 by a piston member 133 biased against the latch 130 by a spring mechanism 132 as shown. As the sweep mechanism approaches the end of its sweep toward the conveyor 200, detent release means are provided for releasing the latch mechanism 130, such means including a fixed housing 136 carrying a plunger 137 which is also spring biased by a spring 138 therein. At the end of the sweep forward stroke as seen in FIG. 5, the upper portion of the latch member 130 comes into contact with the plunger 137 and is pivoted in a counterclockwise direction about pivot means 131 to unlatch the detent 134. Substantially simultaneously, the pin on the chain 108 carrying the drag link 112 is rotated about its sprocket (see FIG. 4) so as to push the assembly 100 in the reverse direction. During the initial rearward movement, a cam 141 engaging a roller 127 on rack 126 permits the rack (under bias of spring 128) to move vertically upward at a controlled rate to rotate pinion 124 clockwise. A second detent 135 on pinion 124 engages the latch 130 to limit the rotational motion of the shaft 118 and the height to which the sweep 122 may be elevated. At the left limit of travel of the sweep mechanism is another cam 140 which has an exposed surface to engage the roller 127 on rack 126 to depress same causing the gear teeth to rotate the pinion 124 in a counterclockwise direction with the biased plunger 133 causing the latch 130 to again engage detent 134 of the pinion 124 and hold same in a latched position with the sweep bar 122 in a down position to engage the next tier of containers.

Figure 4:
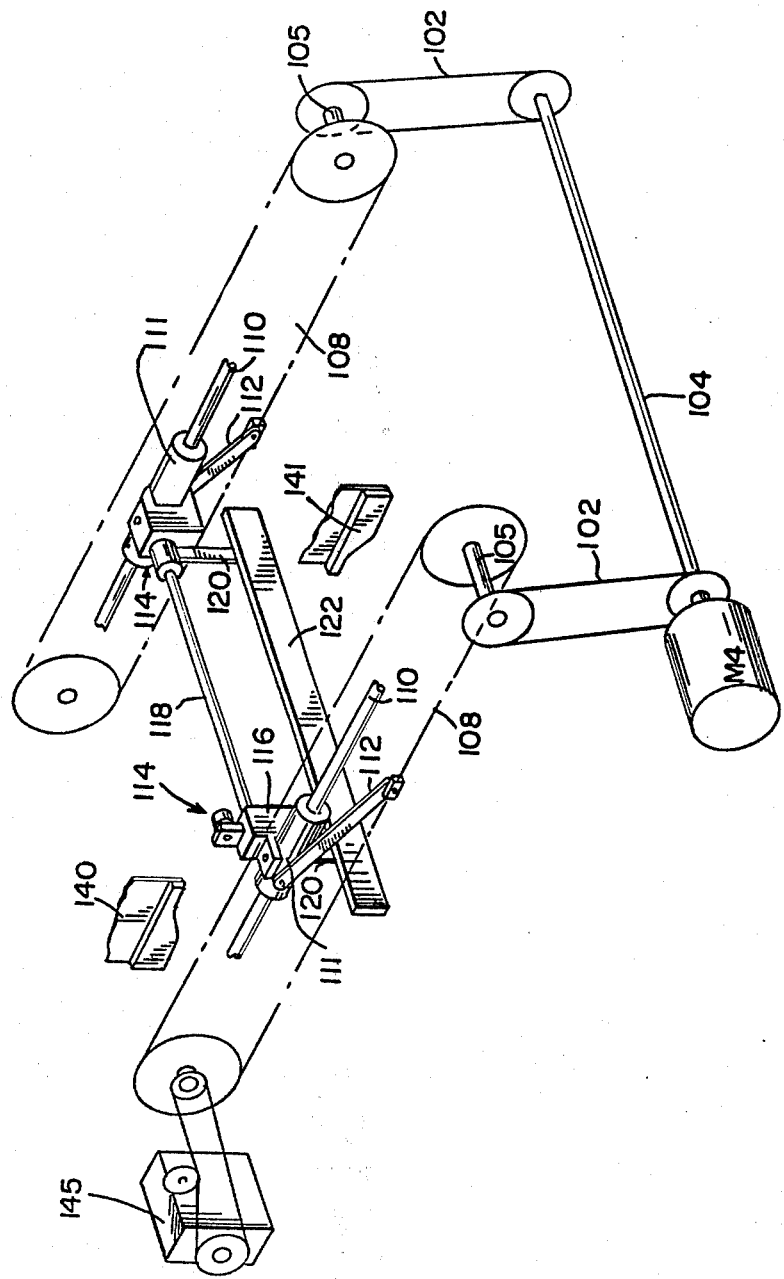
FIG. 4 is a schematic drawing in perspective of a preferred embodiment of the sweep mechanism for removing containers from the loaded pallets.
Figure 5:
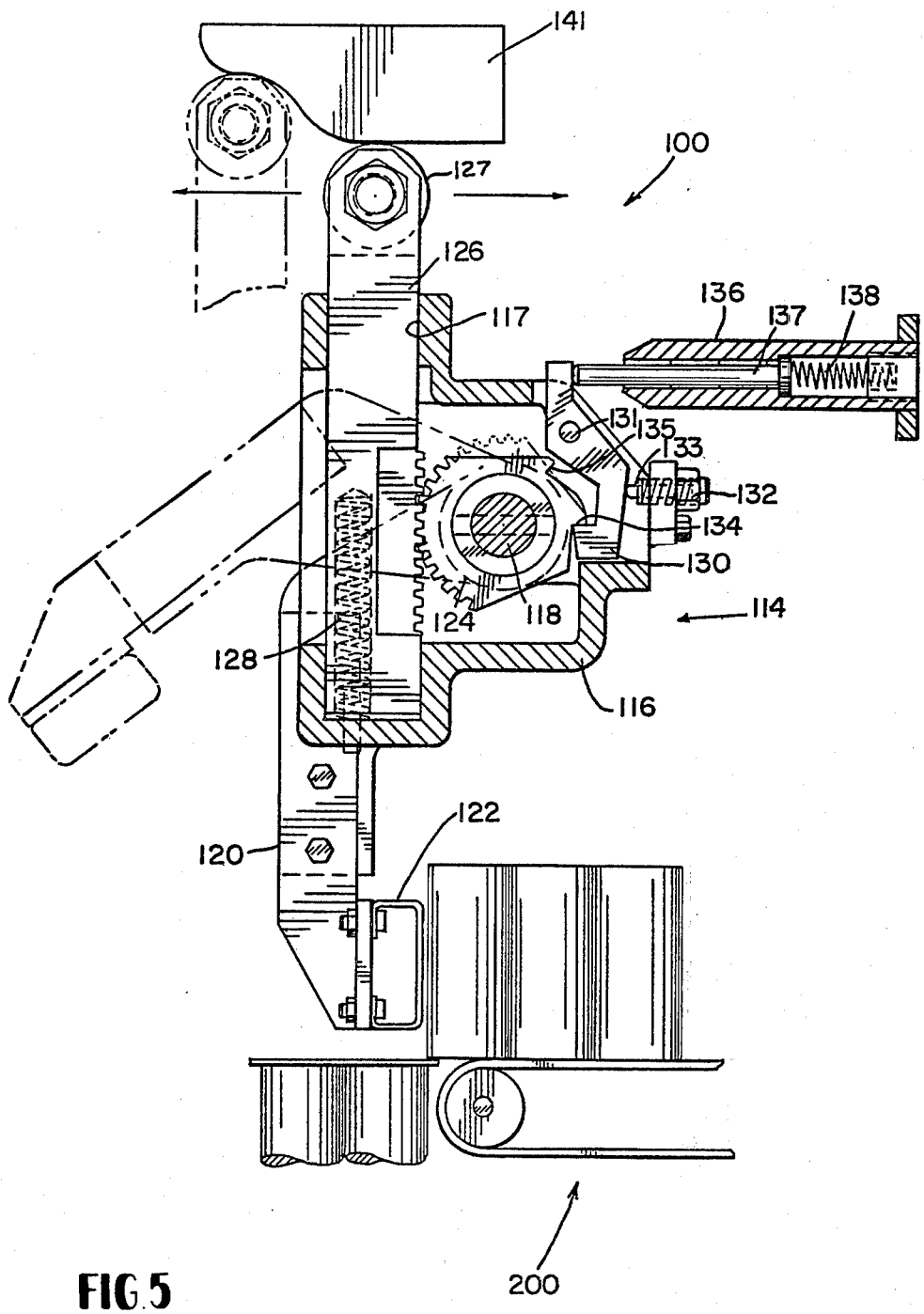
FIG. 5 is a side elevation view in section of a portion of the sweep system of FIG. 4.

As indicated in FIG. 4, the drive chain 108 is also connected by a sprocket as shown to another cam timer 145 having rotary cams therein for indicating the position of the sweep mechanism throughout its reciprocal movement. Preferably, the cams are arranged to rotate through 360° upon one complete reciprocation of the sweep assembly 100 and are utilized to initiate and control the elevator hoist and paper pick-up assemblies as subsequently explained. It should be noted that the sweep assembly will have zero velocity at each end of its travel, and that it will uniformly accelerate as the pin on chain 108 rotates about its sprocket into a drag position. Such precludes a high speed engagement of the bar 122 with the next tier of cans.

PAPER PICK-UP ASSEMBLY

Figure 6:
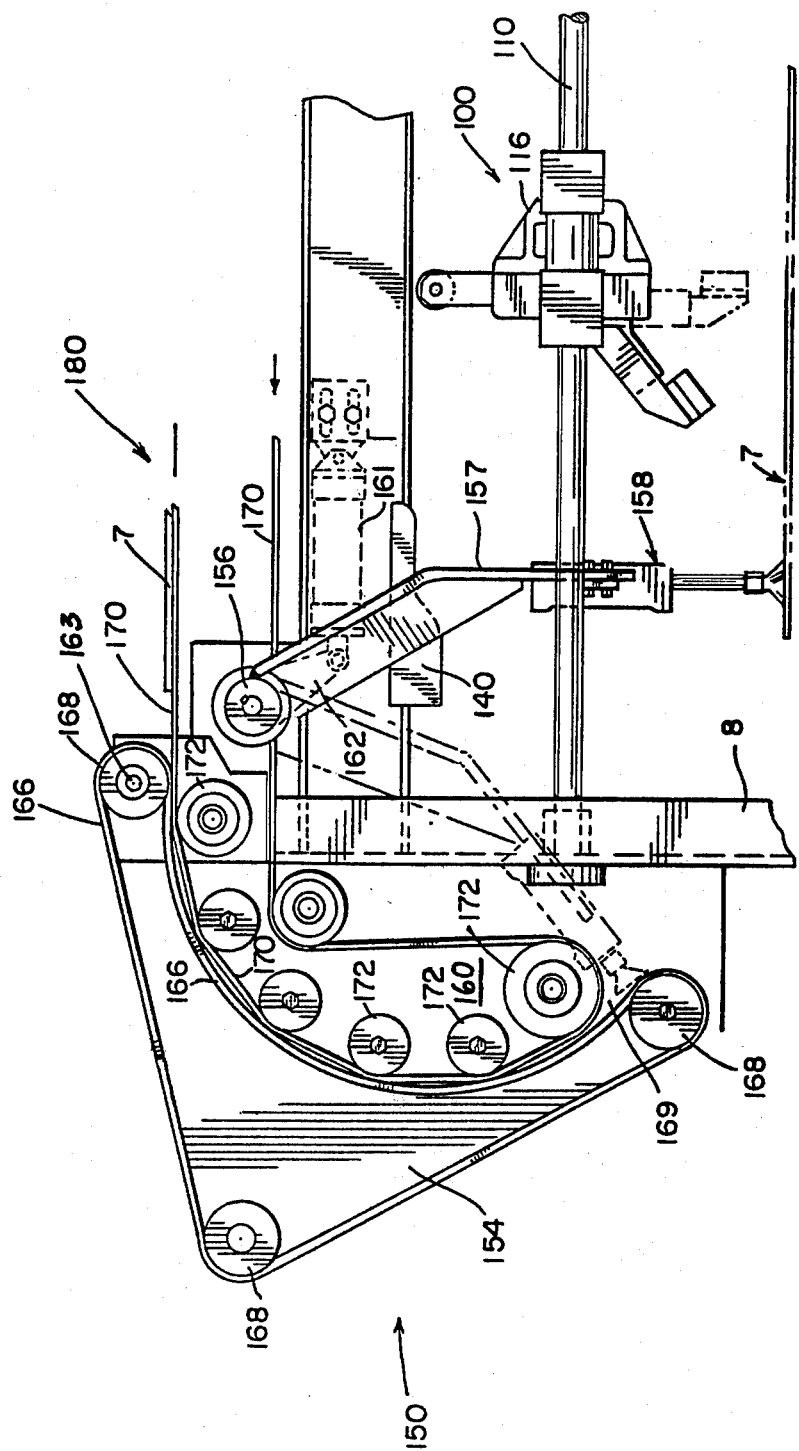
FIG. 6 is a side elevation view of the paperboard discharge means in conjunction with the sweep means for the preferred embodiment.

After each tier of cans are swept onto conveyor 200, the paperboard on top of the next tier must be removed. As best shown in FIGS. 1, 2 and 6, a paper pick-up assembly 150 is supported at the very top of the hoist assembly 20 through vertical columns 8. This paper pick-up assembly 150 comprises suction cups 158 which are extensible and are carried by an arm 157 constrained for rotation with a cross shaft 156 extending across and appropriately supported on the support section of the elevator hoist. Preferably, three such cups are horizontally spaced on shaft 156, but are not shown in FIG. 2 for reasons of simplicity. Such suction cups are of the type which simultaneously extend downwardly and apply a suction to the paper sheets 7 upon the application of a vacuum thereto. After the application of a vacuum and extension of cups 158, an air motor 161 (mounted on a support as indicated) is adapted to rotate a bell crank arm 162 which is constrained for rotation with the shaft 156. Such rotary movement causes rotation of the suction cups 158 and the paper sheet 7 through approximately 50°, at which point the paper sheet 7 is delivered into a paper conveyor 180.

The paper pick-up conveyor comprises two side plates 154 pivotally mounted on shaft 163 carried by support 8 and extend to the left as viewed in FIGS. 1 and 6. These side plates journal two shafts (unnumbered) which, in conjunction with shaft 163, carry two spaced apart sets of pulleys 168 which form a triangle and rotatably carry V-belts 166. Adjacent each belt 166 is a second belt 170 which is also driven around a series of pulleys 172 journaled to fixed plates 160 to form an arc of a circle. Since the pulleys 168 and 172 are in the same vertical plane, the pulleys 172 and belts 170 also act as a drive means for the belts 166. When paper is fed by suction cups 158 into an apex 169 formed by the two sets of belts, the belts, being pressed together, will grip the paper and cause same to rotate to approximately 130°. The paper sheets 7 then ride the belts 170 along conveyor 180 to a collection area 300, the belts 170 forming the principal part of the paper conveyor. A motor M5 (FIG. 1) carried by supports 8 adjacent collection area 300 is sufficient to drive the belts 170. It should be noted that plates 160 form the housing for conveyor 180, and such includes a horizontal portion 160a which may help support the edges of the paper 7 as it is conveyed to collection station C. Obviously, tensioning devices may be provided for each belt.

THE KICKER ASSEMBLY

After the containers and paperboard have been discharged, the pallet must be removed from the elevator assembly. Such is accomplished by a kicker assembly 86 best depicted in FIGS. 1 and 2. The kicker assembly includes a motor M3 which drives the chains 88 on each side of the elevator assembly through a cross shaft (not shown). These chains, through unnumbered sprockets, drive right angle drives 91 which in turn drive chains 90 about two horizontally spaced sprockets suitably supported by the frame 8 and extend the depth of the elevator assembly. Attached to each chain at any point thereon is an arm 92 which extends far enough into the elevator hoist area 20 so as to engage the rear of a pallet and urge same forwardly onto a conveyor 230. This conveyor comprises two chains 231 driven by motor M8 to move the pallet along the conveyor to a collecting area.

Coordinated with this kicker assembly 86 is the rear stacking wall 74. This wall is movable in a vertical direction as illustrated in FIG. 1 in which an air motor 76 is supported by a portion of the frame 8 and has its piston attached to the panel such that upon reciprocation of the air motor 76, the wall 74 moves vertically. Thus as the pallet enters the elevator area, the wall 74 is in downward position and acts to straighten the forward edge of the pallet of containers. Subsequently as the hoist 20 is raised, the rear stacking wall 74 moves upward therewith such that its top edge is substantial parallel to the upper surface of the container conveyor 200. After all tiers of containers are swept off of the pallet, the pallet must be kicked onto the pallet conveyor 230. In order to do this, the rear stacking wall 74 must be lowered to a level coplanar with the upper surface of the pallet conveyor 230, at which time the pallet kicker assembly 86 is actuated such that the arms 92 move the pallet onto the conveyor.

THE CONVEYOR SECTION

As previously mentioned, the conveyor section includes three horizontal conveyors supported between the discharge section A and the collection section C. The container conveyor 200 may be of a conventional belt form having a width substantially equal to the width of the elevator section A, and driven by motors M6. A belt type cross conveyor 202 collects the containers to deliver them to a filling station and is driven by motor M7 through a chain drive as indicated. The paper conveyor 180, as previously explained, may utilize two thin belts 170 on each side of the conveyor driven by motor M5 as shown in FIG. 1, while empty pallet conveyor 230 comprises chain drives 231 along each side of the depalletizer and is driven by motor M8.

THE COLLECTION AREA

From the paper conveyor, the paper is delivered to a paper collection station illustrated in FIG. 7 and such essentially comprises a bin 300. This collection bin has a bottom support 308 with a pallet 5 thereon which is adapted to receive the paper sheets. The sides of the bin 300 include plates 302 carried by supports 8 which depend downwardly and inwardly such that the paper sheets 7, as they fall into the conveyor, are stacked in a neat manner upon the pallet 5. After the bin is full of paper, one may use a fork lift to engage the pallet 5 and to first lift same out of the bin and return the paper to the container manufacturer.

Below the paper collection bin 300 is an elevator shaft 250 which receives the empty pallets from the conveyor 230. Within the elevator shaft 250 is a pallet elevator comprising two elevator units including diametrically opposed depending beams 254 pivotally supported by and jornaled about bar 256. Each beam 254 carries a chain 258 having pallet support arms 262 thereon. As shown in the dotted line position of FIG. 7, a pallet 5 has been delivered by the conveyor 230 onto these pallet support arms 262. Lowering of the elevator may be effected by a reversible motor M9 which drives two right angle drives 257 connected to each other by cross shaft 260 and to each bar 256 about which chain drives 258 extend. As indicated, the two chain drives 258 are pivotally supported on shafts 256 such that the bottom ends of the elevator beams 254 may be urged outwardly to the dotted line position shown in FIG. 7. In the center of the elevator shaft 250 are supports 264 for receiving the empty pallets, and such may comprise three bars extending the depth of the elevator shaft 250. Underneath the middle bar is pivotally attached two pneumatic motors 266 which are also connected to the depending beams 254. Thus when an empty pallet 5 is lowered to the pallet supports 264, air motors 266 expand to urge the elevator beams 254 outwardly to retract the arms 262 from underneath the pallet 5 at which time the elevator motor M9 is reversed. The cylinders 266 remain extended while the support arms 262 are moved upward. At the top of the shaft 250, the motors 266 are retracted and support arms 262 are positioned to receive another pallet.

MODE OF OPERATION

The operation of the preferred embodiment of our invention can be best illustrated with reference to FIGS. 8 and 9. FIG. 8 schematically discloses a portion of the elevator hoist 20, the sweep assembly 100, the infeed conveyor 10, the stacking wall 74, the container conveyor 200 and the pallet conveyor 230. Too, the cams X, Y and Z of the timer 34 associated with the elevator hoist, and those (1, 2 and 3) of timer 145 associated with the sweep mechanism are depicted as mechanically connected to the sprockets for the elevator and sweep mechanism respectively. Additionally, these timers, a micro switch (MC1) and two photoelectric cells PE1 and PE2 are connected to and provided input signals to a control panel which generates output signals for the elements identified in block diagram of FIG. 8 to the right of the control panel. These output signals may actuate relays to operate the individual motors or to actuate solenoid control valves so as to direct air to the pneumatic motors previously identified, such valves and relays being conventional. A timing chart in FIG. 9 illustrates the sequence of operation with the position of the sweep mechanism being plotted along the horizontal axis in terms of degrees while the position of the elevator hoist 20 is plotted along the vertical axis in terms of degrees.

After a loaded pallet has been placed on the input conveyor 10, the motor m1 is actuated by manually pushing the start button on the control panel. At this point, the input conveyor will move the pallet into the hoist area until the micro switch MC1 is closed. When this switch is closed, solenoids are actuated by the control panel to direct air to motors associated with the side squaring panels 42 and 60 inwardly in a manner previously disclosed so as to square the sides of the loaded pallet. Simultaneous with such inward movement of the panels, a signal from the control panel also actuates motor M2 and any appropriate clutch elements (if used) to initiate engagement of the lift bars 30 with the pallet and to commence lifting. Too, the rear stacking wall is also raised with the pallet 5 by air motor 76. The pallet is then raised until the lower photoelectric cell PE2 is actuated by breaking the light beam which causes the control panel to start the motor M4 associated with the sweep mechanism 100. Upon actuation, the sweep mechanism moves forward, for a first dry run to permit pickup of the first sheet of paperboard. As the sweep moves forwardly approximately 90°, cam 1 emits an electric signal to the control panel which actuates air motors 161 of the paper pickup to rotate suction arms 157 downwardly. At 142° of movement of sweep bar 122, a signal from cam 2 causes control panel to extend suction cups 158 to engage the upper sheet of paper 7 on top all the tiers of containers. As the sweep continues in its movement, (since there are no cans stacked on the upper layer of paper) the Gemco timer, (cam 1) upon rotation to approximately 50° while cam 2 signals the control panel to retract suction cups 158. This movement places the paper into the apex 169 between the belts 166 and 170 of the paper conveyor 180. The suction cups 158 remain in this position until the sweep mechanism returns to approximately 90°. Too, at the end of its stroke or 180°, the sweep assembly engages the unlatch mechanism 136 and cam surface 141 permits the sweep bar to rotate such that the elevator may be raised. During rearward movement of the sweep assembly or at 220°, the third cam (3) of the Gemco timer 145 signals the control panel to actuate the motor M2 or clutches (if used) of the elevator hoist to raise the pallet 5 one tier height such that the next sweep will engage a full tier of cans. Subsequently, as the sweep mechanism approaches 360°, it now engages mechanical cam 140, and the rack 126 of the housing assembly 116 is urged downwardly to place the sweep bar 122 in position to move the cans from the first tier onto the can conveyor 200.

Such cycling continues with the elevator hoist being successively raised until no tiers remain on the pallet. At 314° of rotation of cam X (which represents only 152° of rotation of the hoist) of the Gemco timer associated with the position of the hoist elevator 20 is set to indicate that no tiers of containers remain on the pallet and to actuate the pallet discharge. Cam X through the control panel then causes actuation of the pneumatic motor 76 which lowers the stacking wall 74 such that its top is coplanar with the pallet conveyor 230 and reversal of motor M2 to lower the elevator 20. Another cam Y of the Gemco timer indicates when the pallet has been lowered to the same level as the pallet conveyor 230 or to approximately 278°, and stops motor M2 while actuating the kicker assembly 86. After this assembly discharges the empty pallet, a micro switch (not shown) is closed by the kicker assembly and such reversed motor M2 to start raising the hoist. A third cam Z then stops the elevator just prior to 360° of the cam. Obviously, the control panel can also actuate motor M1 of the infeed conveyor 10 to cause another pallet to be conveyed into the hoist area 20 prior to the complete discharge of all containers on the first pallet. By stopping the elevator prior to 360° of the cam Z, the second set of lift bars will not abruptly engage the next pallet, but, if micro switch MC1 is actuated, the motor M2 will immediately commence another cycle. Such describe a complete cycle of the unit.

With respect to the empty pallet collection station C, empty pallets 5 which are delivered by the conveyor 230 thereto are individually lowered through actuation of a micro switch or a photoelectric cell which may actuate the motor M9 associated therewith.

Obviously, many other functions can be automatically controlled by the proposed system. For example, it has been found in practice that a paper gripper adjacent the front edge of the machine and carried by the supports 8 is desirable to grip the paper as the sweeper is going forward. Accordingly, the gripping of this paper through utilization of a pneumatic cylinder can be effected by the utilization of another cam associated with the sweep assembly. Too, the lower and upper side squaring panels 42 and 60 may be retracted by the hoist cans when the hoist is lowered to discharge empty pallets onto discharge conveyor 230.

With respect to this operation of the machine, it should be quite clear that with the utilization of our preferred embodiment, it is completely unnecessary to lower an empty pallet from the elevator hoist 20 prior to picking up another. Such obviously eliminates a timer lag. Too, a most beneficial effect of this preferred embodiment results from the fact that the Gemco timer associated with the sweep mechanism is effective to raise the hoist 20 while the sweep mechanism is reciprocating back to its original position. Too, the utilization of a sweep mechanism which can be raised, lowered and correlated with the elevator hoist is most beneficial in precluding time lags. Since these machines are relatively large and require a great deal of space, it should be obvious that portion thereof, particularly the collection station C, may be placed outside the user's facility, or at a point which is very accessible to afford trucks which are adapted to pick up the paper and the empty pallets.

We claim:

1. In a depalletizer for unloading tiers of containers separated by paperboard from a pallet, said depalletizer having an elevator, discharge means and conveyor means for separately discharging and conveying to a collection area the containers, paperboard and pallets adjacent the top of said elevator, the improvement comprising a pallet elevator including:
    a. an elevator shaft adjacent said conveyor means for pallets for receiving empty pallets therefrom;
    b. two elevator units pivotally attached to the top of said elevator shaft with one elevator unit being separated from the other a distance greater than the width of an intended pallet;
    c. said elevator units including vertically reciprocal members for receiving a pallet and lowering same; and
    d. expansible motors connected to lower portions of said elevator units for pivoting said elevator units apart to release pallet in a lower part of said elevator shaft.

2. In the depalletizer of claim 1, each of said elevator units including a pivot shaft carried by said elevator shaft a depending elevator beam carried by each of said pivot shafts, an endless conveyor member carried by each elevator beam and one of said vertically reciprocal members being carried by each of said endless conveyor members.

3. In the depalletizer of claim 2, said pivot shafts being drive shafts, and means carried by each pivot shaft drivingly connected to its associated endless conveyor member for driving the same.

4. In the depalletizer of claim 3, a single drive unit connected to said drive shafts for driving said drive shafts in unison and in opposite directions.

5. An elevator particularly adapted for lowering pallets, said elevator comprising means defining an elevator column, support means within and at the bottom of said elevator column for receiving pallets, a pair of pivotal shafts supported at the upper end of said elevator column in parallel relation and on opposite sides of said elevator column, a depending elevator beam pivotally carried by each of said pivotal shafts, an upright endless conveyor carried by each of said elevator beams, opposed pallet supports carried by said endless conveyors, the spacing between said endless conveyors being greater than the dimension of a pallet to be handled by said elevator and the spacing of said pallet supports normally being less than said pallet dimension, drive means connected to said endless conveyors for selectively driving said endless conveyors in unison and in vertical reciprocal relation, and extensible means interconnecting lower portions of said elevator beams for pivoting said elevator beams about said pivot shafts and increasing the spacing of said pallet supports when in lower positions to be greater than pallet dimension to release a pallet support thereby.

6. The elevator of claim 5 wherein said means includes means for rotating said pivotal shafts, and means interconnecting said shafts with said endless conveyors for driving the same.

7. The elevator of claim 6 wherein said drive means includes a single reversible drive motor connected to said pivotal shafts for driving the same in unison and in opposite directions.

* * * * *